H. Andes.
Beer Pump.
No. 95,628.　　　　　　　　　Patented Oct. 12, 1869.
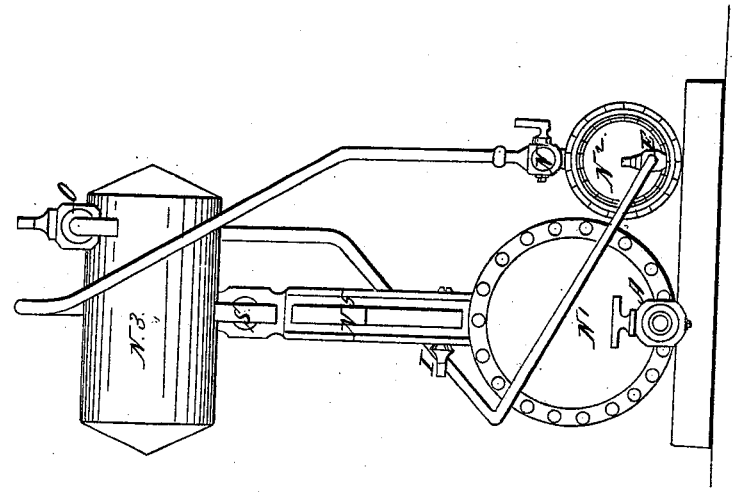
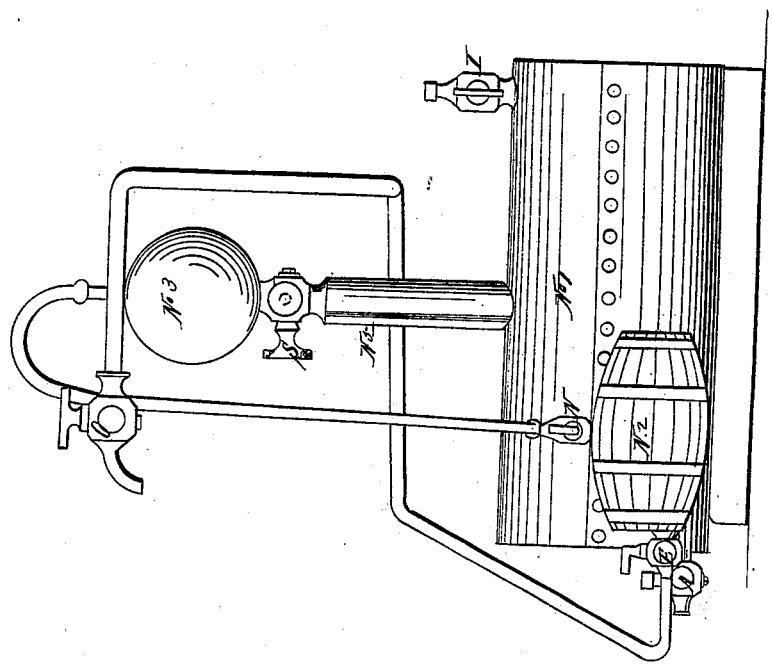
Witnesses:
Stanley Woodward
James Walsh
Inventor:
Henry Andes

United States Patent Office.

HENRY ANDES, OF WILKESBARRE, PENNSYLVANIA.

Letters Patent No. 95,628, dated October 12, 1869.

---

IMPROVEMENT IN PNEUMATIC APPARATUS FOR DRAWING ALE.

---

The Schedule referred to in these Letters Patent and making part of the same.

---

*To all whom it may concern:*

Be it known that I, HENRY ANDES, of Wilkesbarre, in the county of Luzerne, in the State of Pennsylvania, have invented a new and improved Pneumatic Device for Forcing Ale and Beer; and I do hereby declare that the following is a full and exact description thereof, reference being had to the accompanying drawings, and to the letters of reference marked thereon.

Attach a gutta-percha pipe to spicket T, and also to a hydrant, which forces water into vessel number one. Close spicket A in front of vessel number one. Open all the other spickets, except spicket O on top of the machine. Turn spicket S, so that the part designated E S is up, and S down.

While the water is forced into vessel number one from the gutta-percha pipe, which is imagined to be attached to the top of spicket T, it (viz, the water,) will press the air from vessel number one to vessel number three. Then open both spickets, viz, N and E, on vessel number two, which represents the beer-barrel.

In order to find out whether the beer has pressure enough, open spicket O. If the pressure is strong enough, close spicket T. Watch gauge number five by looking how the water rises, which you can see through the glass attached to the front of it. As soon as you observe the water rising in the gauge, close spicket T, so as to turn off the water. Then turn spicket E S and S, so that S stands to the left and E S to the right. Open spicket A, and run the water out of vessel number one.

While the water is running out of vessel number one, the spicket E S S will admit air in an opening at the left of the spicket.

What I claim as my invention, and desire to secure by Letters Patent, is—

The arrangement of the air-compressing vessel number one with its inlet and outlet cocks, I and A, the perpendicular tube or cylinder with the cock S, and enlargement number three, the cock N, and the cocks E and O, and connecting-pipes, all substantially as shown and described.

HENRY ANDES.

Witnesses:
GUSTAV HAHN,
MORGAN LAKE.